US011626728B2

(12) United States Patent
Takahashi et al.

(10) Patent No.: US 11,626,728 B2
(45) Date of Patent: Apr. 11, 2023

(54) CONDITION MONITORING SYSTEM AND STORAGE MEDIUM STORING THEREON CONDITION MONITORING PROGRAM

(71) Applicant: KABUSHIKI KAISHA TOSHIBA, Tokyo (JP)

(72) Inventors: Hiroshi Takahashi, Yokohama Kanagawa (JP); Atsuro Oonishi, Kawasaki Kanagawa (JP); Takamitsu Sunaoshi, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 119 days.

(21) Appl. No.: 17/249,361

(22) Filed: Feb. 26, 2021

(65) Prior Publication Data

US 2022/0085602 A1 Mar. 17, 2022

(30) Foreign Application Priority Data

Sep. 16, 2020 (JP) .............................. JP2020-155127

(51) Int. Cl.
*H02J 1/06* (2006.01)
*H02J 1/10* (2006.01)
*G06F 9/4401* (2018.01)
*H02J 1/14* (2006.01)

(52) U.S. Cl.
CPC ............ *H02J 1/106* (2020.01); *G06F 9/4418* (2013.01); *H02J 1/14* (2013.01); *H02J 2310/60* (2020.01)

(58) Field of Classification Search
CPC .... H02J 2310/60; H02J 2310/58; H02J 1/106; G06F 9/4418
See application file for complete search history.

(56) References Cited

U.S. PATENT DOCUMENTS

| 10,411,612 | B2 | 9/2019 | Oonishi et al. |
| 10,615,726 | B2 | 4/2020 | Oonishi et al. |
| 10,811,949 | B2 | 10/2020 | Oonishi et al. |
| 2017/0059423 | A1 | 3/2017 | Suzuki |
| 2017/0076800 | A1 | 3/2017 | Musha |
| 2017/0226981 | A1 | 8/2017 | Furuishi et al. |

(Continued)

FOREIGN PATENT DOCUMENTS

| JP | 2008-234361 A | 10/2008 |
| JP | 2017-54574 A | 3/2017 |

(Continued)

*Primary Examiner* — Harry R Behm
(74) *Attorney, Agent, or Firm* — Finnegan, Henderson, Farabow, Garrett & Dunner L.L.P.

(57) ABSTRACT

A condition monitoring system includes a power generator and a condition monitoring apparatus. The condition monitoring apparatus includes, voltage measuring circuit which measures a voltage value of power generated by the power generator, a data memory which stores a past voltage value measured by the voltage measuring circuit, a calculation circuit which calculates a difference between a current voltage value measured by the voltage measuring circuit and at least one past voltage value stored in the data memory, and a controller which determines an issue period indicating a period of time until a trigger signal is issued based on the difference calculated by the calculation circuit, and issues the trigger signal to the condition monitoring apparatus based on the issue period.

9 Claims, 11 Drawing Sheets

(56) References Cited

U.S. PATENT DOCUMENTS

| | | | |
|---|---|---|---|
| 2017/0343987 A1* | 11/2017 | Jayakumar | .......... G06F 11/1438 |
| 2019/0293601 A1 | 9/2019 | Sugiyama | |
| 2019/0313181 A1 | 10/2019 | Fujimori et al. | |
| 2020/0374604 A1* | 11/2020 | Park | ........................ H04Q 9/00 |
| 2021/0356417 A1* | 11/2021 | Babakhani | ........... G01N 27/228 |

FOREIGN PATENT DOCUMENTS

| | | |
|---|---|---|
| JP | 2017-141699 A | 8/2017 |
| JP | 6193322 B2 | 9/2017 |
| JP | 2017-229118 A | 12/2017 |
| JP | 2018-110315 A | 7/2018 |
| JP | 2018-157724 A | 10/2018 |
| JP | 2019-22409 A | 2/2019 |
| JP | 2019-42710 A | 3/2019 |
| JP | 2019-162905 A | 9/2019 |
| JP | 2019-168331 A | 10/2019 |

* cited by examiner

CONDITION MONITORING SYSTEM AND STORAGE MEDIUM STORING THEREON CONDITION MONITORING PROGRAM

CROSS-REFERENCE TO RELATED APPLICATIONS

This application is based upon and claims the benefit of priority from Japanese Patent Application No. 2020-155127, filed Sep. 16, 2020, the entire contents of which are incorporated herein by reference.

FIELD

Embodiments described herein generally relate to a condition monitoring system and a storage medium storing thereon a condition monitoring program.

BACKGROUND

A vibration power generator is a power generator that generates power by converting mechanical energy generated by mechanical vibration into electric energy. A vibration power generator produces electricity through the utilization of environmental vibration. Examples of the environmental vibration include vibration of a car or a train, and vibration generated when rain hits the ground. Power generated by a vibration power generator is a promising power source for a condition monitoring apparatus, etc. which monitors the condition of a target. In a condition monitoring system that combines a vibration power generator and a condition monitoring apparatus, in order for the condition monitoring apparatus to operate stably, it is necessary that the amount of power generated by the vibration power generator be equal to or greater than the amount of power consumed by the condition monitoring apparatus. In such a condition monitoring system, it is desired that the condition monitoring apparatus be capable of operating at the maximum frequency, while satisfying the conditions for energy balance between the power generated by the vibration power generator and the power consumed by the condition monitoring apparatus.

DETAILED DESCRIPTION

Figure 1:
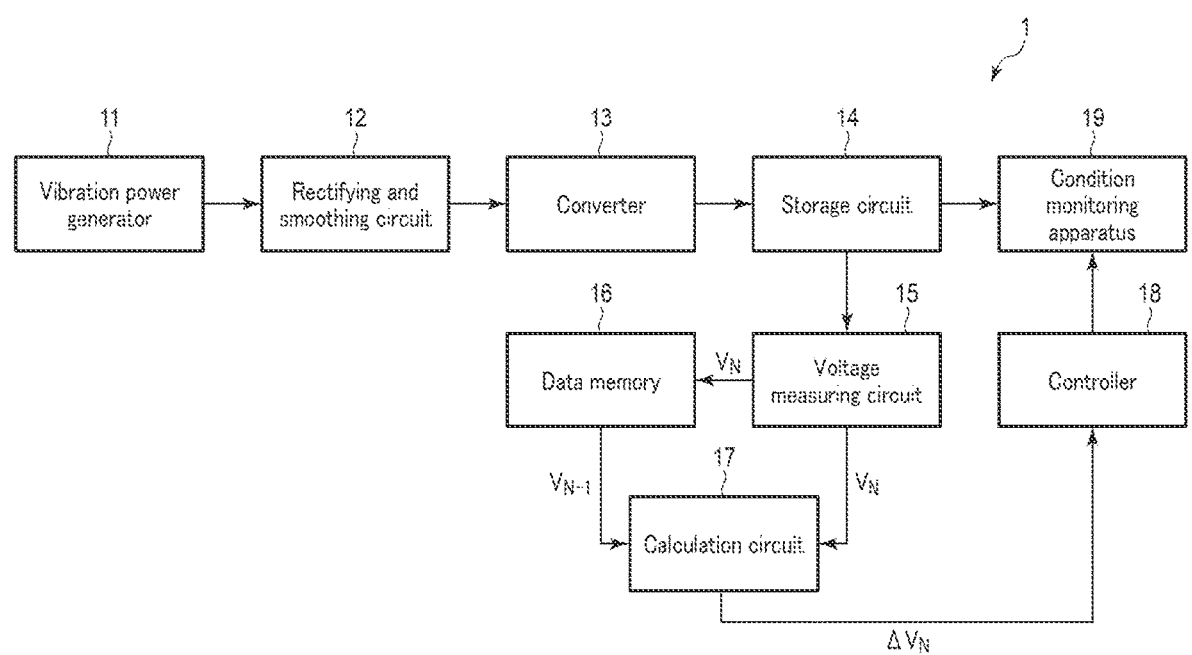
FIG. 1 is a configuration diagram of a condition monitoring system according to a first embodiment.

In general, according to one embodiment, a condition monitoring system includes a power generator and a condition monitoring apparatus. The condition monitoring apparatus includes, voltage measuring circuit which measures a voltage value of power generated by the power generator, a data memory which stores a past voltage value measured by the voltage measuring circuit, a calculation circuit which calculates a difference between a current voltage value measured by the voltage measuring circuit and at least one past voltage value stored in the data memory, and a controller which determines an issue period indicating a period of time until a trigger signal is issued based on the difference calculated by the calculation circuit, and issues the trigger signal to the condition monitoring apparatus based on the issue period.

Hereinafter, embodiments will be described with reference to the drawings. Throughout the embodiments to be described below, the same constituent element will be referred to by the same reference numeral, and a repeated description will be omitted. The drawings are either schematic or conceptual.

First Embodiment

FIG. 1 is a configuration diagram of a condition monitoring system according to a first embodiment. A condition monitoring system 1 of the first embodiment includes a vibration power generator 11, a rectifying and smoothing circuit 12, a converter 13, a storage circuit 14, a voltage measuring circuit 15, a data memory 16, a calculation circuit 17, a controller 18, and a condition monitoring apparatus 19.

The vibration power generator 11 is installed in a target to be condition monitored by the condition monitoring apparatus 19, or in the periphery thereof. The vibration power generator 11 includes an electromagnetic induction element or a piezoelectric element, and generates power by converting mechanical energy from mechanical vibration caused by environmental vibration, etc. into electric energy.

The rectifying and smoothing circuit 12 includes a combination circuit of a rectifying circuit and a smoothing circuit. The rectifying circuit rectifies an alternating-current voltage corresponding to an alternating-current power output from the vibration power generator 11. The smoothing circuit generates a direct-current voltage by smoothing the rectified alternating-current voltage. With this configuration, the rectifying and smoothing circuit 12 converts an alternating-current power output from the vibration power generator 11 into a direct-current power.

The converter 13 transforms the direct-current voltage output from the rectifying and smoothing circuit 12 into a direct-current voltage of a magnitude that enables the condition monitoring apparatus 19 to operate.

The storage circuit 14 includes, for example, a capacitor, and stores a direct-current power output from the converter 13 by temporarily storing a current output from the converter 13 as a charge. The direct-current power stored in the storage circuit 14 is used as a power source for the condition monitoring apparatus 19.

The voltage measuring circuit 15 measures the storage voltage stored in the storage circuit 14 as a voltage corresponding to the power generated by the vibration power generator 11. The voltage measuring circuit 15 outputs the voltage value $V_N$ of the measured storage voltage to the data memory 16 and the calculation circuit 17. The suffix N indicates that the value to which it is attached is of an N-th measurement that has been performed by the voltage measuring circuit 15. The voltage measuring circuit 15 may output the measured voltage value as a digital value.

The data memory 16 stores the value of the past storage voltage measured by the voltage measuring circuit 15. The data memory 16 stores, for example, the voltage value $V_N$ output from the voltage measuring circuit 15, and outputs the previously stored voltage value $V_{N-1}$ to the calculation circuit 17.

The calculation circuit 17 calculates a difference between the value of the current storage voltage measured by the voltage measuring circuit 15 and the value of the past storage voltage output from the data memory 16. For example, the calculation circuit 17 calculates a difference $\Delta V_N$ between the current voltage value $V_N$ measured by the voltage measuring circuit 15 and the previous voltage value $V_{N-1}$ output from the data memory 16. The calculation circuit 17 outputs the calculated difference $\Delta V_N$ to the controller 18. The calculation circuit 17 need not necessarily calculate a difference between the current voltage value and the previous voltage value. The calculation circuit 17 may calculate a difference between the current voltage value and a given past voltage value.

The controller 18 determines an issue period $T_N$ of a trigger signal corresponding to the difference $\Delta V_N$ based on a predetermined relational expression or a reference table. The issue period $T_N$ is a period of time from issue of a trigger signal to issue of the next trigger signal. The controller 18 outputs a trigger signal to the condition monitoring apparatus 19 at an issue time $t_N$ which is determined based on the issue period $T_N$.

The condition monitoring apparatus 19 is installed in a target to be condition monitored or the periphery thereof, and executes a condition monitoring operation of monitoring the condition of the target using a sensor, etc. The sensor, etc. used in the condition monitoring operation is not limited to a specific one. The sensor, etc. used in the condition monitoring operation may be any sensor, etc. that can be operated by consuming the power generated by the vibration power generator 11. The condition monitoring apparatus 19 is basically in a sleep status. In the sleep status, the condition monitoring apparatus 19 operates with the minimum amount of power for detecting reception of a trigger signal from the controller 18. The minimum amount of power may be power generated by the vibration power generator 11, or may be power supplied from another power source provided in the condition monitoring apparatus 19. Upon receiving a trigger signal, the condition monitoring apparatus 19 wakes up from the sleep status, and executes a condition monitoring operation. The condition monitoring apparatus 19 returns to the sleep status after executing a condition monitoring operation. An operation period of the condition monitoring apparatus 19, which is a period of time from the wakeup of the condition monitoring apparatus 19 to its return to the sleep status, may vary according to the type and number of sensors required in the condition monitoring operation, the number of items of measurement data, and the sampling cycle of measurement data (measurement span), etc. The type and number of sensors, the number of items of measurement data, and the sampling cycle of the measurement data may vary according to what condition of the target to be condition monitored is to be monitored. That is, the operation period of the condition monitoring apparatus 19 may be a design parameter that is appropriately set according to the target to be condition monitored on a case-by-case basis.

In the condition monitoring system 1, the rectifying and smoothing circuit 12, the converter 13, the storage circuit 14, the voltage measuring circuit 15, the data memory 16, the calculation circuit 17, and the controller 18 may be configured integrally with the vibration power generator 11, or may be configured integrally with the condition monitoring apparatus 19, or may be configured to be separated from the vibration power generator 11 and the condition monitoring apparatus 19. The rectifying and smoothing circuit 12, the converter 13, the storage circuit 14, the voltage measuring circuit 15, the data memory 16, the calculation circuit 17, and the controller 18 may be operated by power generated by the vibration power generator 11, may be operated by power supplied from a power source of the condition monitoring apparatus 19, or may be operated by power supplied from another power source. In addition, the rectifying and smoothing circuit 12, the converter 13, the storage circuit 14, the voltage measuring circuit 15, the data memory 16, the calculation circuit 17, and the controller 18 may be respectively configured using hardware such as a dedicated circuit, a processor, or a memory. Processing similar to that performed by the voltage measuring circuit 15, the calculation circuit 17, the controller 18, etc. may be performed by a condition monitoring program that is executed by a processor.

Figure 2A:
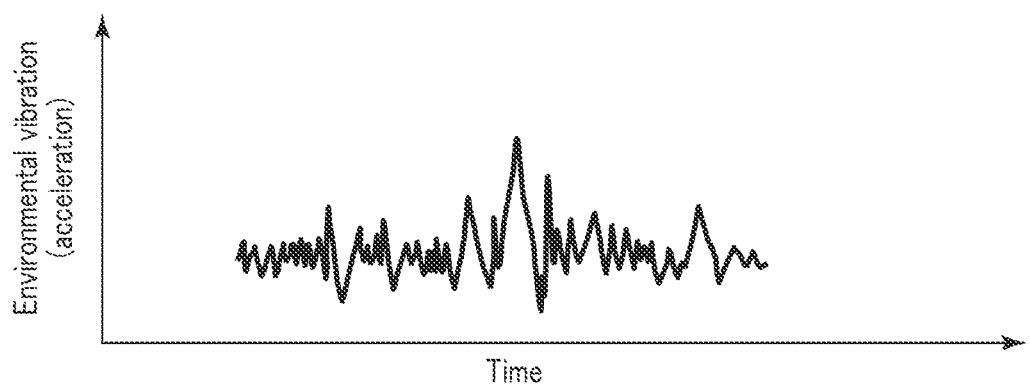
FIG. 2A is a diagram illustrating an example of change of environmental vibration in an environment in which the condition monitoring system is used.

Next, an operation of the condition monitoring system 1 will be described. FIG. 2A is a diagram illustrating an example of change of environmental vibration in an environment in which the condition monitoring system 1 is used. In FIG. 2A, the horizontal axis represents time, and the vertical axis represents an acceleration generated in the vibration power generator 11, namely, the environmental vibration. In most cases, the environmental vibration varies greatly with the passage of time, as shown in FIG. 2A. Accordingly, if the interval at which the condition monitoring apparatus 19 wakes up is constant, there is a possibility that, according to the condition of the environmental vibration, the amount of power needed for the condition monitoring to operate may not be stored in the storage circuit 14 at a timing when the condition monitoring apparatus 19 wakes up.

In the present embodiment, an issue period $T_N$ of a trigger signal is actively adjusted in such a manner that an energy balance between the power generated by the vibration power generator 11 and the power consumed by the condition monitoring apparatus 19 satisfies a condition. The condition for the energy balance is that the amount of power generated by the vibration power generator 11 is equal to or greater than the amount of power consumed by the condition monitoring apparatus 19. To increase the operation frequency of the condition monitoring apparatus 19, it is desirable that the issue period $T_N$ of the trigger signal be adjusted in the shortest possible period of time that satisfies the condition for the energy balance.

Figure 2B:
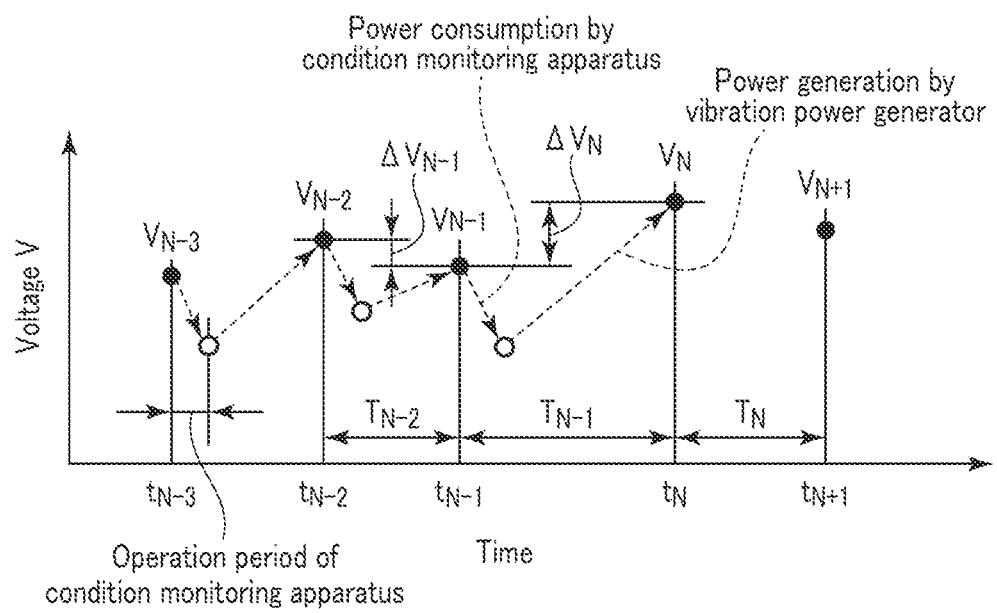
FIG. 2B is a diagram showing change of storage power and consumption power in the condition monitoring system.

FIG. 2B is a diagram showing change of the storage power and the consumption power in the condition monitoring system 1. In FIG. 2B, the horizontal axis represents time, and the vertical axis represents a storage voltage of the storage circuit 14. Each of the white circles in FIG. 2B represents a storage voltage of the storage circuit 14 which has decreased in accordance with the consumption of power by the condition monitoring apparatus 19. Each of the black circles in FIG. 2B represents a storage voltage of the storage circuit 14 which has increased in accordance with the generation of power by the vibration power generator 11. When the condition monitoring apparatus 19 is activated, the power stored in the storage circuit 14 is consumed by the condition monitoring apparatus 19, and the storage voltage of the storage circuit 14 decreases from the value at the black circle to the value at the white circle. As a result of the power generation by the vibration power generator 11, the storage voltage of the storage circuit 14 increases from the value at the white circle to the value at the black circle.

The amount of decrease of the storage voltage in accordance with the consumption of power by the condition monitoring apparatus 19 may be tracked by measuring the relationship between the operation period of the condition monitoring apparatus 19 and the magnitude of the voltage decrease. If the operation period of the condition monitoring apparatus 19 is constant, the amount of decrease of the storage voltage in accordance with the consumption of power by the condition monitoring apparatus 19 may be treated as a fixed value.

In the present embodiment, if, for example, the condition monitoring apparatus 19 is activated at time $t_{N-1}$ in FIG. 2B, the calculation circuit 17 calculates a difference $\Delta V_{N-1}$ between the current voltage value $V_{N-1}$ and the past voltage value $V_{N-2}$, and outputs the calculated difference $\Delta V_{N-1}$ to the controller 18. The controller 18 determines an issue period $T_{N-1}$ of a next trigger signal based on a difference $\Delta V_{N-1}$. The difference $\Delta V_{N-1}$ corresponds to an energy balance between the power generated by the vibration power generator 11 and the power consumed by the condition monitoring apparatus 19 during the issue period $T_{N-2}$. That is, by adjusting the issue period according to the difference $\Delta V_{N-1}$, the conditions for the energy balance are satisfied. In the example of FIG. 2B, since the current voltage value $V_{N-1}$ is smaller than the past voltage value $V_{N-2}$, the difference $\Delta V_{N-1}$ is a negative value. The current voltage value $V_{N-1}$ being smaller than the past voltage value $V_{N-2}$ means that the energy balance between the power generated by the vibration power generator 11 and the power consumed by the condition monitoring apparatus 19 is not balanced, such as due to a decrease in the amount of power generated by the vibration power generator 11 resulting from variations in the environmental vibration, for example. At this time, the controller 18 makes the issue period $T_{N-1}$ longer than the previous issue period $T_{N-2}$. Thereby, even if the power generated by the vibration power generator 11 has been decreased, the storage voltage of the storage circuit 14 can be maintained at a high value.

If the condition monitoring apparatus 19 is activated at time $t_N$, the calculation circuit 17 calculates a difference $\Delta V_N$ between the current voltage value $V_N$ and the past voltage value $V_{N-1}$, and outputs the calculated difference $\Delta V_N$ to the controller 18. The controller 18 determines an issue period $T_N$ of a next trigger signal based on the difference $\Delta V_N$. In the example of FIG. 2B, since the current voltage value $V_N$ is larger than the past voltage value $V_{N-1}$, the difference $\Delta V_N$ is a positive value. At this time, the controller 18 makes the issue period $T_{N-1}$ shorter than the previous issue period $T_{N-2}$. This reduces the period of time for the condition monitoring apparatus 19 to wake up, thus increasing the operation frequency of the condition monitoring apparatus 19.

The issue period calculated by the controller 18 is the period of time assumed to be necessary to store the same amount of energy as would be consumed by the condition monitoring apparatus 19. In most cases, however, the environmental vibration varies greatly in terms of time. It is thus highly likely that the same amount of storage energy as the amount of energy to be consumed by the condition monitoring apparatus 19 cannot be obtained in a fixed issue period. Accordingly, the controller 18 updates the issue period on a case-by-case basis.

Figure 3A:
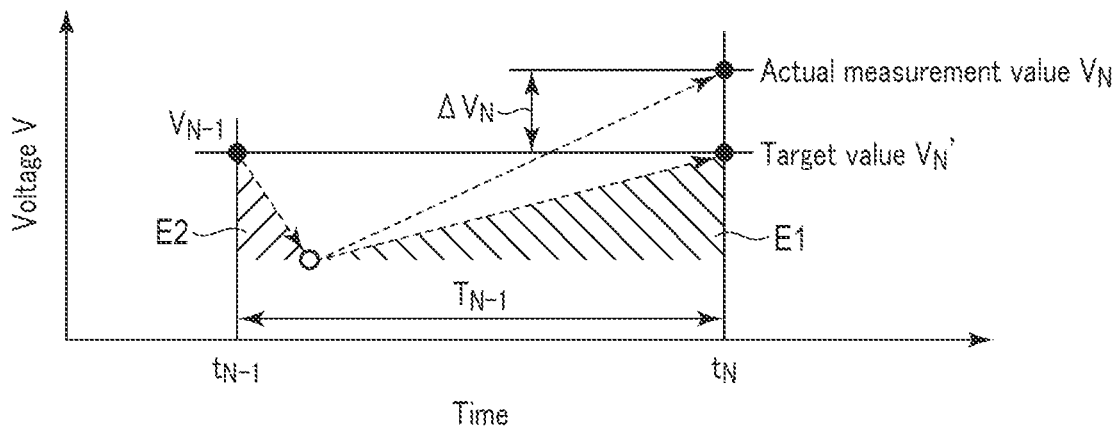
FIG. 3A is a diagram showing a relationship between a target value and an actual measurement value of a voltage value.
Figure 3B:
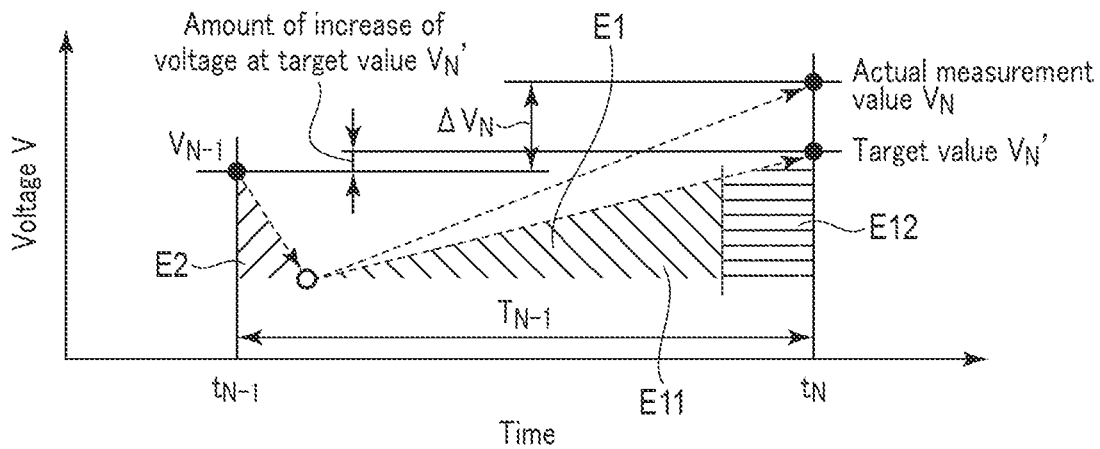
FIG. 3B is a diagram showing a relationship between a target value and an actual measurement value of a voltage value.

FIGS. 3A and 3B are diagrams illustrating a relationship between a target value and an actual measurement value of the voltage value. In the example of FIG. 3A, at time $t_{N-1}$, an issue period $T_{N-1}$ is calculated based on a target value $V_N'$ of a storage voltage of the storage circuit 14 at time $t_N$, in such a manner that conditions for the energy balance between the power consumed by the condition monitoring apparatus 19 and the power generated by the vibration power generator 11 are satisfied. For example, the target value $V_N'$ is the same value as the previous voltage value $V_{N-1}$. At this time, the height of a region E1 representing a change of a voltage corresponding to the energy stored in the vibration power generator 11 and the height of a region E2 representing a change of a voltage corresponding to the energy consumed by the condition monitoring apparatus 19 become equal, as shown in FIG. 3A. This means that the conditions for the energy balance are satisfied. However, since there is actually a difference between the target value $V_N'$ and the actual measurement value $V_N$, the issue period $T_N$ needs to be updated based on the actual measurement value $V_N$ at time $t_N$, too. The same applies to time $t_{N+1}$ and thereafter.

In the example of FIG. 3B, the target value $V_N'$ of the storage voltage at time $t_N$ is a higher value than the previous voltage value $V_{N-1}$. The target value $V_N'$ is, in the example of FIG. 3B, determined in view of a region E12 representing a change of a voltage corresponding to extra energy, in addition to the region E11 representing a change of a voltage corresponding to the energy stored in the vibration power generator 11 that is equal to the region E2 representing a change of a voltage corresponding to the energy consumed by the condition monitoring apparatus 19. In this case, even if the environmental vibration during the issue period $T_{N-1}$ decreases, the voltage value of the storage circuit 14 is expected to be maintained at a high level.

Figure 4A:
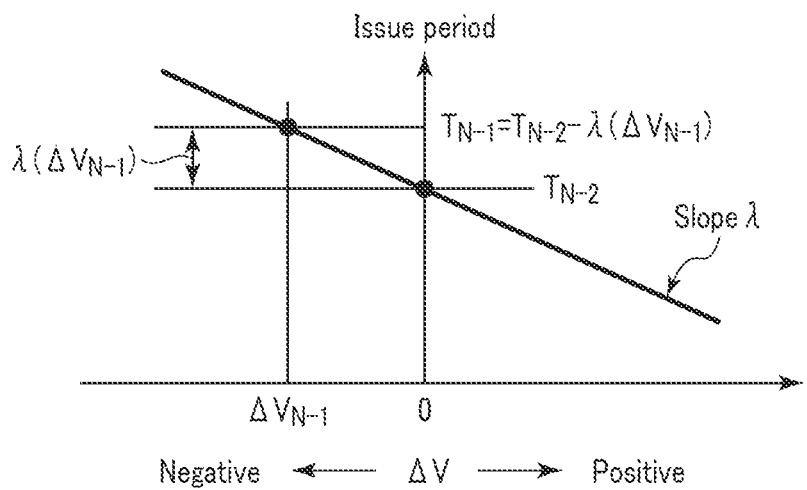
FIG. 4A is a diagram illustrating an example of deriving an issue period from a difference in voltage value.
Figure 4B:
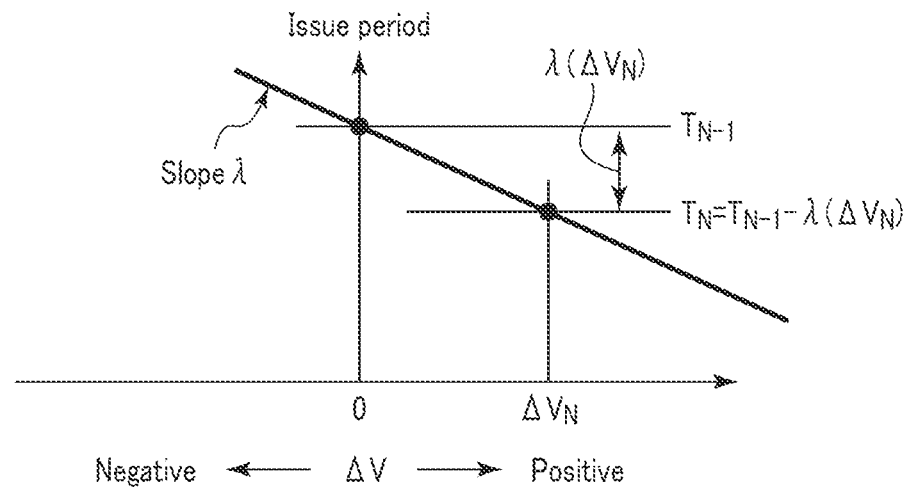
FIG. 4B is a diagram illustrating an example of deriving an issue period from a difference in voltage value.

FIGS. 4A and 4B are diagrams illustrating an example of deriving an issue period from the difference in voltage value.

FIG. 4A is a diagram illustrating an example of deriving an issue period $T_{N-1}$ at time $t_{N-1}$ in FIG. 2B. The controller 18 derives an issue period $T_{N-1}$ by, for example, subtracting a correction value $\lambda(\Delta V_{N-1})$ which is based on the difference $\Delta V_{N-1}$ calculated by the calculation circuit 17 from the issue period $T_{N-2}$ at the past time $t_{N-2}$. Here, $\lambda$ is a coefficient, and is a parameter for designing the device based on the energy balance. As described above, the issue period $T_N$ decreases as the difference $\Delta V_N$ increases, and increases as the difference $\Delta V_N$ decreases. Accordingly, the relational expression between the difference $\Delta V_N$ and the issue period $T_N$ is expressed by, for example, the following linear equation (Formula 1): In this case, λ corresponds to the slope of Formula 1.

$$T_N = T_{N-1} - \lambda(\Delta V_N) \quad \text{(Formula 1)}$$

The relational expression between the difference $\Delta V_N$ and the issue period $T_N$ need not be a linear equation, in which case λ may be a value other than a slope. In addition, the relationship between the difference $\Delta V_N$ and the issue period $T_N$ may be represented by a reference table. Here, if the change of the voltage corresponding to the extra energy shown in FIG. 3B is not taken into consideration, the issue period $T_{N-1}$ is equal to the issue period $T_{N-2}$ when the difference $\Delta V_{N-1}$ is zero, as clear from Formula 1.

In FIG. 4A, an example of obtaining an issue period $T_{N-1}$ at the current time $t_{N-1}$ using the issue period $T_{N-2}$ at the previous time $t_{N-2}$ is shown. The issue period $T_{N-1}$ may be calculated using issue periods $T_{N-3}$, $T_{N-4}$, ... at given past times $t_{N-3}$, $t_{N-4}$, ... , or may be calculated using a combination of issue periods at a plurality of past times. For example, the past issue period $T_{N-1}$ of Formula 1 may be a mean, etc. of a plurality of past issue period.

FIG. 4B is a diagram illustrating an example of deriving an issue period $T_N$ at time $t_N$ in FIG. 2B. The controller 18 derives an issue period $T_N$ by, for example, subtracting a correction value $\lambda(\Delta V_N)$ which is based on the difference $\Delta V_N$ calculated by the calculation circuit 17 from the issue period $T_{N-1}$ at the past time $t_{N-1}$.

Figure 5:
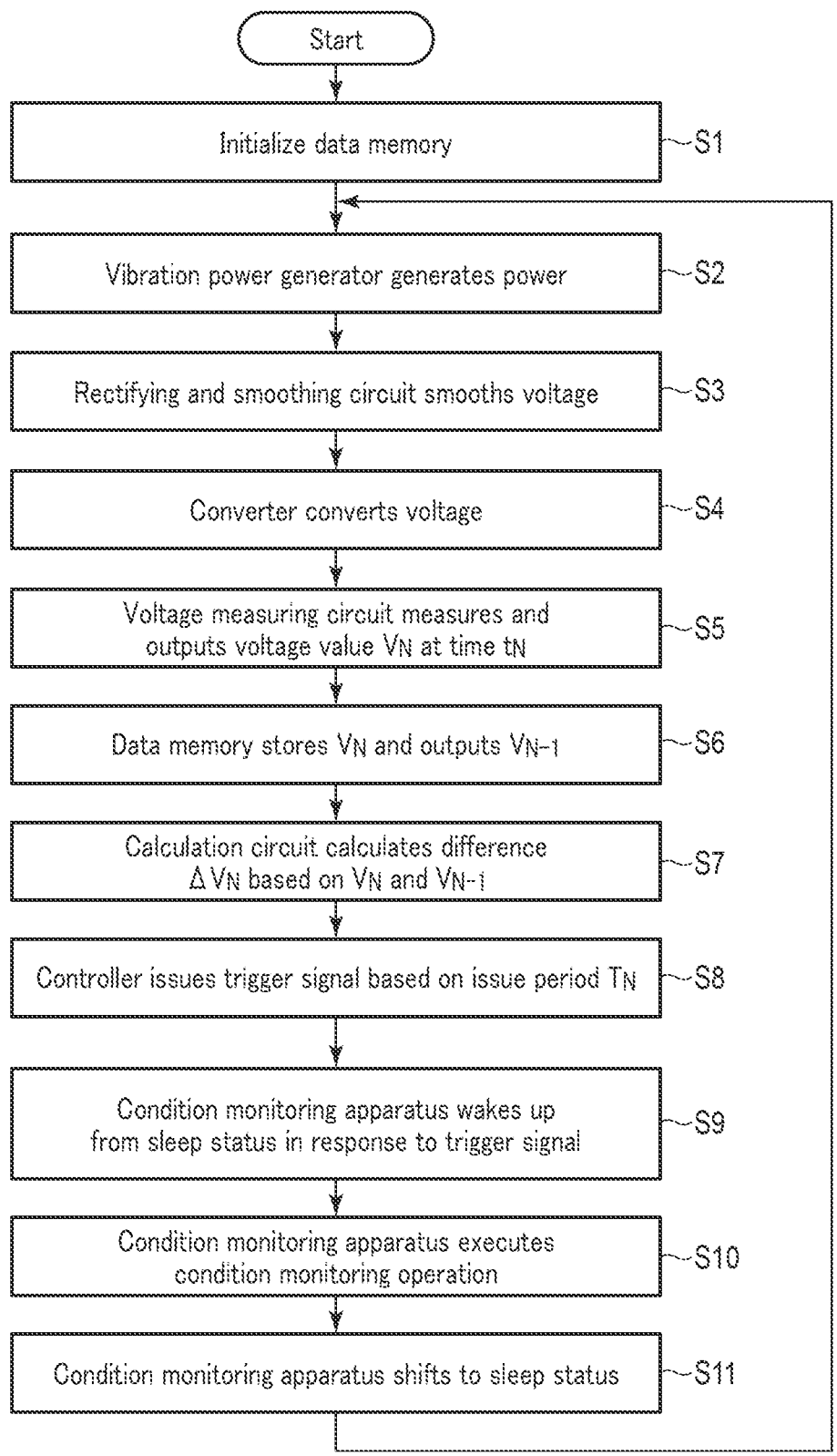
FIG. 5 is a flowchart showing an operation of a condition monitoring system according to the first embodiment.

FIG. 5 is a flowchart showing an operation of a condition monitoring system 1 according to the first embodiment. At step S1, the data memory 16 initializes a voltage value stored therein. The initial value of the voltage value of the data memory 16 may be freely determined.

At step S2, the vibration power generator 11 generates power through the utilization of the environmental vibration. At step S3, the rectifying and smoothing circuit 12 rectifies an alternating-current voltage output from the vibration power generator 11. In addition, the rectifying and smoothing circuit 12 smooths the rectified voltage. At step S4, the converter 13 transforms the direct-current voltage output from the rectifying and smoothing circuit 12. The direct-current voltage that has been transformed by the converter 13 is stored in the storage circuit 14.

At step S5, the voltage measuring circuit 15 measures a value $V_N$ of the storage voltage of the storage circuit 14. The voltage measuring circuit 15 outputs the voltage value $V_N$ to the data memory 16 and the calculation circuit 17.

At step S6, the data memory 16 stores the voltage value $V_N$. The data memory 16 outputs the voltage value $V_{N-1}$ to the calculation circuit 17.

At step S7, the calculation circuit 17 calculates a difference $\Delta V_N$. The calculation circuit 17 outputs the difference $\Delta V_N$ to the controller 18.

At step S8, the controller 18 calculates an issue period $T_N$ based on the difference $\Delta V_N$. The issue period $T_N$ may be calculated based on the above-described linear equation or a reference table. After calculating the issue period $T_N$, the controller 18 issues a trigger signal to the condition monitoring apparatus 19 at time $t_N$ after passage of the issue period $T_N$.

At step S9, the condition monitoring apparatus 19 wakes up in response to a trigger signal. At step S10, the condition monitoring apparatus 19 executes a condition monitoring operation. At step S11 after the condition monitoring operation, the condition monitoring apparatus 19 shifts to a sleep status. Thereafter, the processing returns to step S2.

As described above, according to the first embodiment, an issue period of a trigger signal for waking up a condition monitoring apparatus is determined based on a difference between the current value and the past value of the storage voltage in the vibration power generator. This allows the condition monitoring apparatus to operate at the maximum frequency, while satisfying the conditions for the energy balance between the power generated by the vibration power generator and the power consumed by the condition monitoring apparatus. Thereby, the condition monitoring apparatus can be stably run for a long period of time. In addition, according to the condition monitoring system of the embodiment, the vibration power generator generates a large amount of power in the presence of strong environmental vibration, resulting in a decrease in the issue period. That is, the frequency of the condition monitoring operation of the condition monitoring apparatus increases. Accordingly, in the present embodiment, an abnormal status resulting from the environmental vibration can be detected with high precision, compared to a condition monitoring system which executes a condition monitoring operation at a preset time interval.

For example, when the condition of crack of a target is monitored with an acoustic emission (AE) sensor that is employed as the condition monitoring apparatus, large AE waves are output when the target vibrates greatly. In the present embodiment, since the AE sensor operates at a high frequency when the target vibrates greatly, the AE sensor can reliably sense the AE waves even if the AE sensor is not equipped with a wake-up sensor such as an acceleration sensor.

In the present embodiment, an issue period of a trigger signal for waking up the condition monitoring apparatus is determined by measuring the storage voltage of the storage circuit used in an operation of the condition monitoring apparatus. This eliminates the necessity for the condition monitoring system to include an additional sensor such as an acceleration sensor that detects the conditions for waking up the condition monitoring apparatus. This reduces the amount of power consumed by the entire condition monitoring system.

In the present embodiment, the issue period is assumed to be calculated based on a difference between the current storage voltage and the past storage voltage. However, the configuration is not limited thereto. The difference may be calculated, for example, after giving different weights to the current storage voltage and the past storage voltage. The weights may be given to the current storage voltage and the past storage voltage according to their respective absolute values. Alternatively, a difference between a squared value of the current storage voltage and a squared value of the past storage voltage may be calculated. Still alternatively, a mean of the current storage voltage and the past storage voltage may be used. The same applies to the modification and the second embodiment to be described below.

In the present embodiment, the condition monitoring apparatus is assumed to operate based on power generated by the vibration power generator. The present embodiment is applicable to any system that includes an alternating-current power generator of various types for converting an unstable energy of various types into an electric energy.

Modification of First Embodiment

Figure 6:
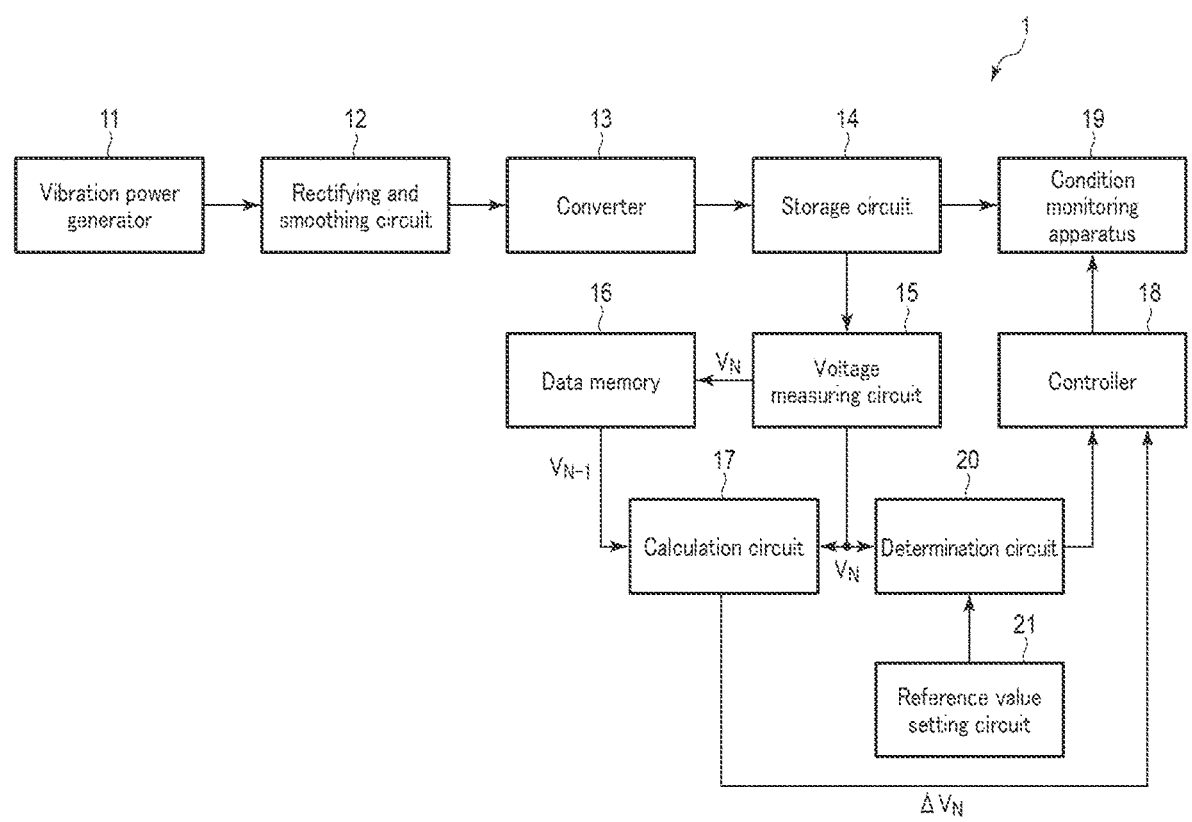
FIG. 6 is a configuration diagram of a condition monitoring system according to a modification of the first embodiment.

FIG. 6 is a configuration diagram of a condition monitoring system according to a modification of the first embodiment. The condition monitoring system 1 according to the modification further includes a determination circuit 20 and a reference value setting circuit 21. The determination circuit 20 receives a current storage voltage measured by the voltage measuring circuit 15 and a reference value set in the reference value setting circuit 21, and determines whether or not the current storage voltage $V_N$ is within a range defined by the reference value. The determination circuit 20 outputs a determination result to the controller 18. The reference value setting circuit 21 sets a reference value for the storage voltage. The reference value is a value of at least one of an upper limit and a lower limit of the storage voltage.

The reference value setting circuit 21 may be configured using hardware such as a memory. The determination circuit 20 may be configured using hardware such as a processor. Processing similar to that of the determination circuit 20 may be implemented by a program that is executed by a processor.

In the modification, the controller 18 calculates an issue period $T_N$ corresponding to a difference $\Delta V_N$ based on a predetermined relational expression or reference table, and issues a trigger signal at time $t_N$ corresponding to the issue period $T_N$, similarly to the first embodiment. When it is determined by the determination circuit 20 that the current storage voltage $V_N$ is not within the range defined by the reference value, the controller 18 issues a trigger signal irrespective of the issue period $T_N$, or stops issuing a trigger signal at time $t_N$.

Figure 7A:
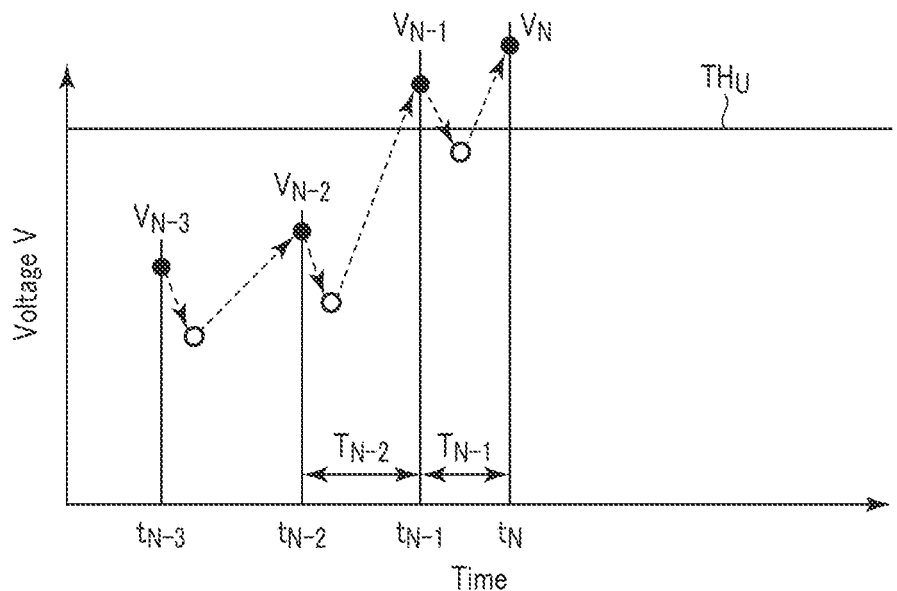
FIG. 7A is a diagram showing change of storage power and consumption power in which an upper-limit reference value is not taken into consideration.
Figure 7B:
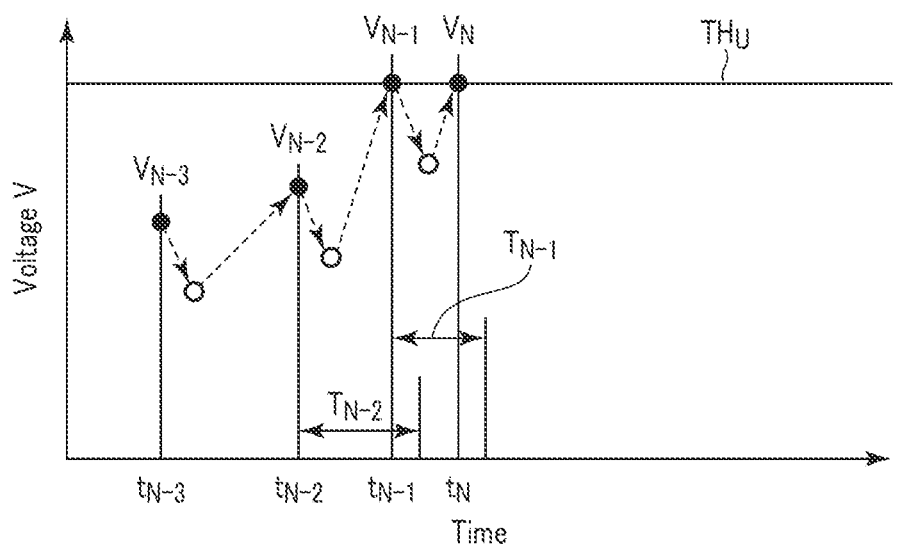
FIG. 7B is a diagram showing change of the storage power and the consumption power in which the upper-limit reference value is taken into consideration.

FIG. 7A is a diagram showing change of the storage power and the consumption power in which an upper-limit reference value is not taken into consideration. FIG. 7B is a diagram showing change of the storage power and the consumption power in which the upper-limit reference value is taken into consideration.

In FIG. 7A, if the condition monitoring apparatus 19 is activated at time $t_{N-2}$, the calculation circuit 17 calculates a difference $\Delta V_{N-2}$ between the current voltage value $V_{N-2}$ and the past voltage value $V_{N-3}$, and outputs the calculated result to the controller 18. The controller 18 calculates an issue period $T_{N-2}$ based on the difference $\Delta V_{N-2}$. The controller 18 outputs a trigger signal to the condition monitoring apparatus 19 at time $t_{N-1}$ after passage of the issue period $T_{N-2}$. Similarly, if the condition monitoring apparatus 19 is activated at time $t_{N-1}$, the calculation circuit 17 calculates a difference $\Delta V_{N-1}$ between the current voltage value $V_{N-1}$ and the past voltage value $V_{N-2}$, and outputs the calculated result to the controller 18. The controller 18 calculates an issue period $T_{N-1}$ based on the difference $\Delta V_{N-1}$. The controller 18 outputs a trigger signal to the condition monitoring apparatus 19 at time $t_N$ after passage of the issue period $T_{N-1}$.

When the reference value of the storage voltage is not taken into consideration, the issue of a trigger signal by the controller 18 is always in accordance with the issue period. Thus, in the case of a sudden increase of the environmental vibration, for example, the storage voltage may rapidly increase and exceed the upper-limit reference value $TH_U$. In FIG. 7A, for example, the storage voltage $V_{N-1}$ at time $t_{N-1}$ exceeds the upper-limit reference value. If the storage voltage rapidly increases, the next issue period $T_{N-1}$ is shortened. However, since the original value of the storage voltage is high, there is a possibility that the storage voltage $V_N$ after passage of the issue period $T_{N-1}$ exceeds the upper-limit reference value $TH_U$ again, as shown in FIG. 7A. In most cases, withstanding voltage specifications and design conditions are generally set in an electric circuit, etc. for defining the maximum permissible voltage. Accordingly, it is important to provide an upper-limit reference value for the voltage to prevent breakdown or malfunction of the device.

In the modification, a trigger signal is issued based on an upper-limit reference value as well as the difference $\Delta V$, as shown in FIG. 7B. The controller 18 calculates, for example, an issue period $T_{N-2}$ at time $t_{N-2}$. The determination circuit 20 monitors the storage voltage measured by the voltage measuring circuit 15, and outputs, to the controller 18, a notification that a trigger signal is to be issued at a time at which the storage voltage has reached the upper-limit reference value. The controller 18 issues a trigger signal upon receiving a notification from the determination circuit 20, without waiting for the passage of the issue period $T_{N-2}$, and activates the condition monitoring apparatus 19. Thereby, the power stored in the storage circuit 14 is consumed. Upon issuing the trigger signal, the controller 18 calculates the next issue period $T_{N-1}$, using the difference $\Delta V$ calculated by the calculation circuit 17 as a difference $\Delta V_{N-1}$. Similarly, the controller 18 calculates, for example, an issue period $T_{N-1}$ at time $t_{N-1}$. On the other hand, the determination circuit 20 monitors the storage voltage measured by the voltage measuring circuit 15, and outputs, to the controller 18, a notification that a trigger signal is to be issued at a time at which the storage voltage has reached the upper-limit reference value again. The controller 18 issues a trigger signal upon receiving a notification from the determination circuit 20, without waiting for the passage of the issue period $T_{N-1}$, and activates the condition monitoring apparatus 19.

Figure 8:
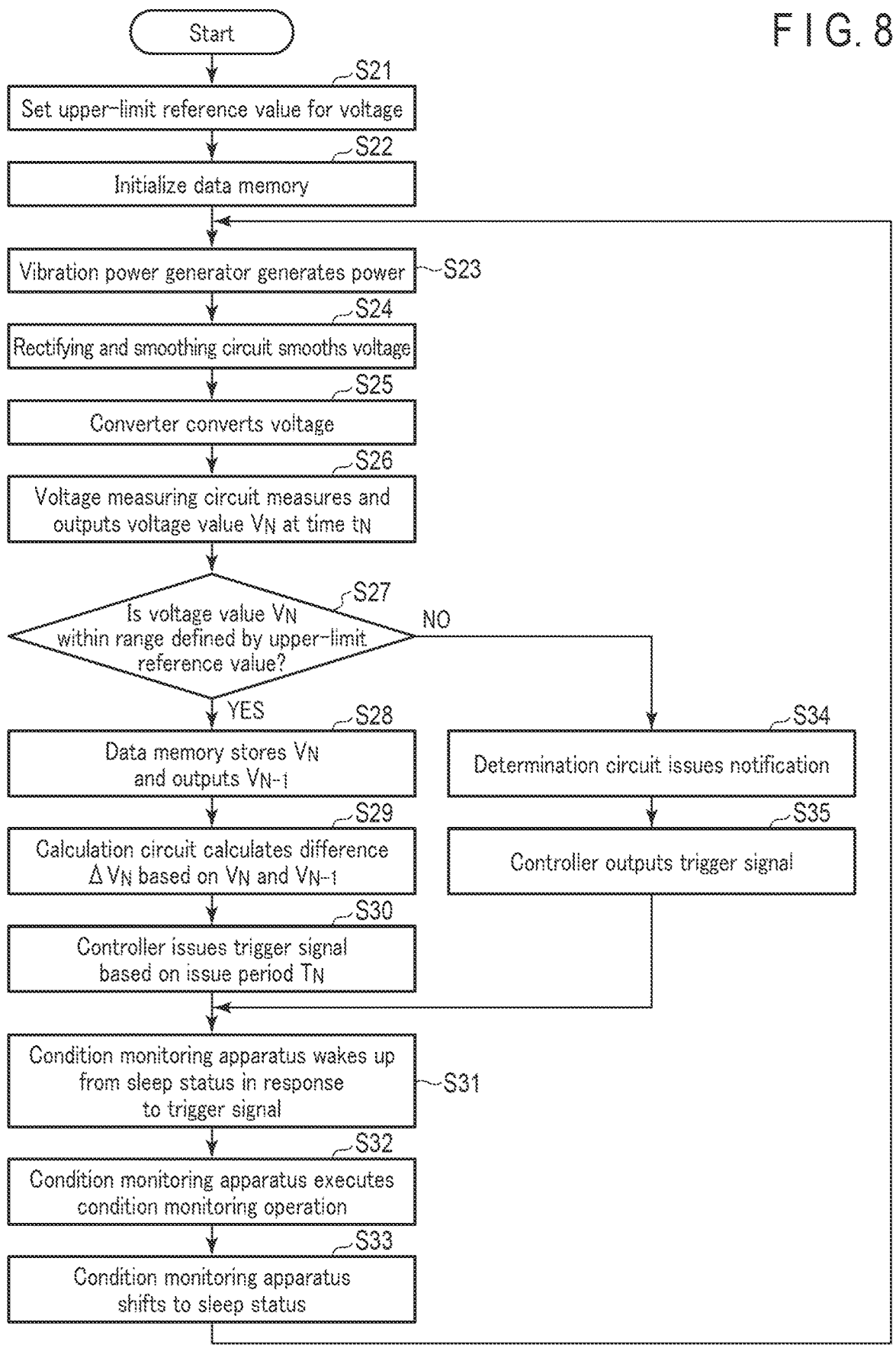
FIG. 8 is a flowchart showing an operation of a condition monitoring system according to the modification, in which the upper-limit reference value is taken into consideration.

FIG. 8 is a flowchart showing an operation of the condition monitoring system 1 according to the modification in which the upper-limit reference value is taken into consideration. In FIG. 8, a description of a process similar to that of FIG. 5 is omitted.

At step S21, the reference value setting circuit 21 sets an upper-limit reference value. The upper-limit reference value is suitably determined according to, for example, the withstanding voltage of the condition monitoring apparatus 19.

The processing from step S22 to step S25 is similar to that of steps S1 to S4 in FIG. 5. Accordingly, a description thereof will be omitted.

At step S26, the voltage measuring circuit 15 outputs a voltage value $V_N$ to the data memory 16, the calculation circuit 17, and the determination circuit 20. In the example of FIG. 8, the voltage measuring circuit 15 monitors the voltage at a shorter interval than the interval of the issue period, and outputs the voltage value $V_N$.

At step S27, the determination circuit 20 determines whether or not the voltage value $V_N$ is within the range defined by the upper-limit reference value $TH_U$, namely, whether or not the voltage value $V_N$ is equal to or lower than the upper-limit reference value $TH_U$. At step S27, when the voltage value $V_N$ is determined as being within the range defined by the upper-limit reference value $TH_U$, the processing advances to step S28. At step S27, when the voltage value $V_N$ is determined as not being within the range defined by the upper-limit reference value $TH_U$, the processing advances to step S34.

The processing from step S28 to step S33 when the voltage value $V_N$ is within the range defined by the upper-limit reference value $TH_U$ is similar to that of steps S6 to S11 in FIG. 5. That is, the issue period $T_N$ is calculated based on the voltage value $V_N$, and a trigger signal is issued based on the issue period $T_N$.

At step S34, when the voltage value $V_N$ is not within the range defined by the upper-limit reference value $TH_U$, the determination circuit 20 issues a notification to the controller 18 that a trigger signal is to be issued.

At step S35, upon receiving the notification from the determination circuit 20, the controller 18 issues a trigger signal to the condition monitoring apparatus 19. Thereafter, the processing shifts to step S31. That is, the condition monitoring apparatus 19 wakes up immediately, and executes a condition monitoring operation.

In this manner, in the processing of FIG. 8, the controller 18 adjusts the timing of issuing a trigger signal to the condition monitoring apparatus 19 in such a manner that the storage voltage does not exceed the upper-limit reference value, based on the determination of the determination circuit 20. Thereby, prevention of breakdown and malfunction of the device is expected.

Figure 9A:
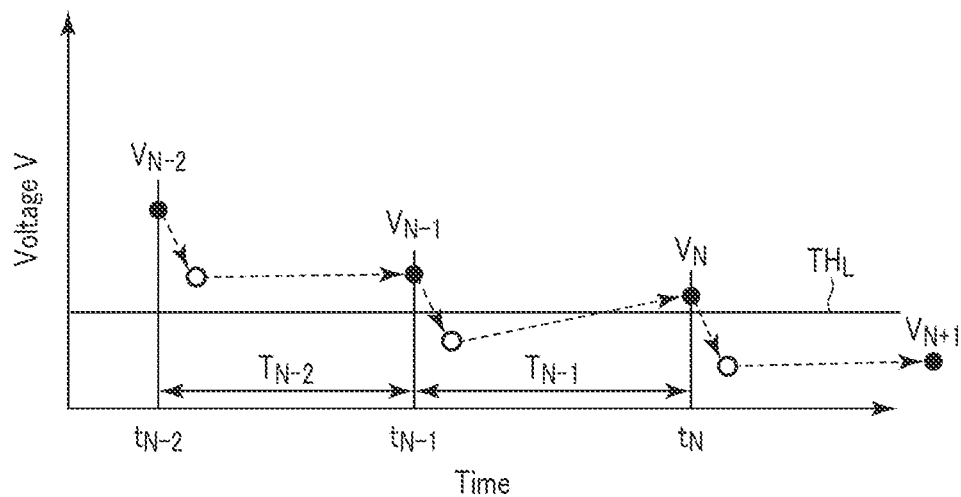
FIG. 9A is a diagram showing change of the storage power and the consumption power in which a lower-limit reference value is not taken into consideration.
Figure 9B:
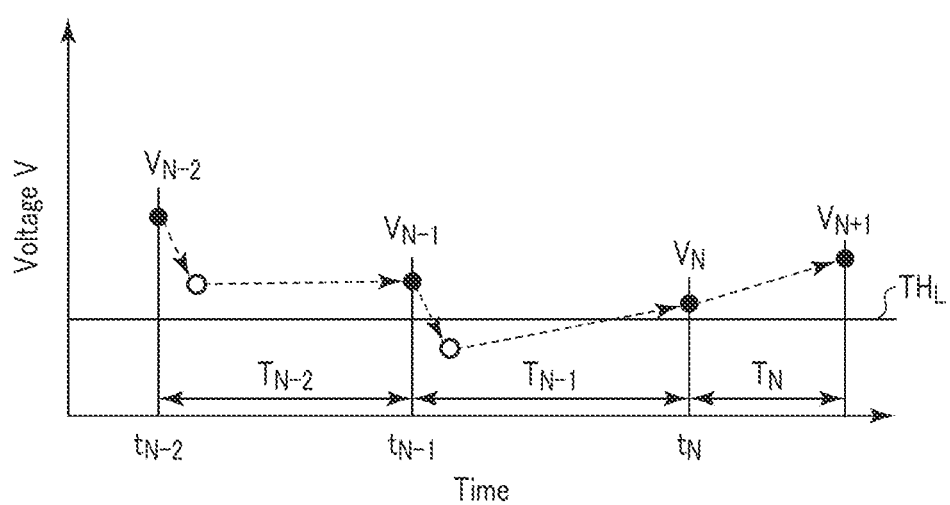
FIG. 9B is a diagram showing change of the storage power and the consumption power in which the lower-limit reference value is taken into consideration.

FIG. 9A is a diagram showing change of the storage power and the consumption power in which a lower-limit reference value is not taken into consideration. FIG. 9B is a diagram showing change of the storage power and the consumption power in which the lower-limit reference value is taken into consideration.

In FIG. 9A, if the condition monitoring apparatus 19 is activated at time $t_{N-2}$, the calculation circuit 17 calculates a difference $\Delta V_{N-2}$ between the current voltage value $V_{N-2}$ and the past voltage value $V_{N-3}$, and outputs the calculated result to the controller 18. The controller 18 calculates an issue period $T_{N-2}$ based on the difference $\Delta V_{N-2}$. The controller 18 outputs a trigger signal to the condition monitoring apparatus 19 at time $t_{N-1}$ after passage of the issue period $T_{N-2}$. Similarly, if the condition monitoring apparatus 19 is activated at time $t_{N-1}$, the calculation circuit 17 calculates a difference $\Delta V_{N-1}$ between the current voltage value $V_{N-1}$ and the past voltage value $V_{N-2}$, and outputs the calculated result to the controller 18. The controller 18 calculates an issue period $T_{N-1}$ based on the difference $\Delta V_{N-1}$. The controller 18 outputs a trigger signal to the condition monitoring apparatus 19 at time $t_N$ after passage of the issue period $T_{N-1}$.

When the reference value of the storage voltage is not taken into consideration, the issue of a trigger signal by the controller 18 is always in accordance with the issue period. In the case of a sudden decrease of the environmental vibration, for example, the storage voltage may decrease and fall below the lower-limit reference value $TH_L$. In FIG. 9A, for example, the storage voltage may fall below the lower-limit reference value in accordance with the decrease of the voltage caused by an operation of the condition monitoring apparatus 19 at time $t_{N-1}$. If the storage voltage decreases, the next issue period $T_{N-1}$ is lengthened. However, since the original value of the storage voltage is low, there is a possibility that the storage voltage may fall below the lower-limit reference value $TH_L$ again in accordance with the decrease of the voltage caused by an operation of the condition monitoring apparatus 19 at time $t_N$ after passage of the issue period $T_{N-1}$, as shown in FIG. 9A. In the condition monitoring system 1, a device including electric circuitry such as the condition monitoring apparatus 19 is activated by a power generated by vibration. Accordingly, there is a case where such a device cannot be operated stably, in accordance with the decrease in voltage. It is thus important to provide a lower-limit reference value for the storage voltage to achieve a stable operation of the device.

In the modification, a trigger signal is issued based on a lower-limit reference value, as shown in FIG. 9B. The controller 18 calculates an issue period $T_{N-1}$ at time $t_{N-1}$. The determination circuit 20 monitors the storage voltage measured by the voltage measuring circuit 15, and outputs, to the controller 18, a notification that issue of a trigger signal is to be stopped when the storage voltage reaches the lower-limit reference value. Upon receiving a notification from the determination circuit 20, the controller 18 stops issuing a trigger signal after passage of the issue period $T_{N-1}$.

Figure 10:
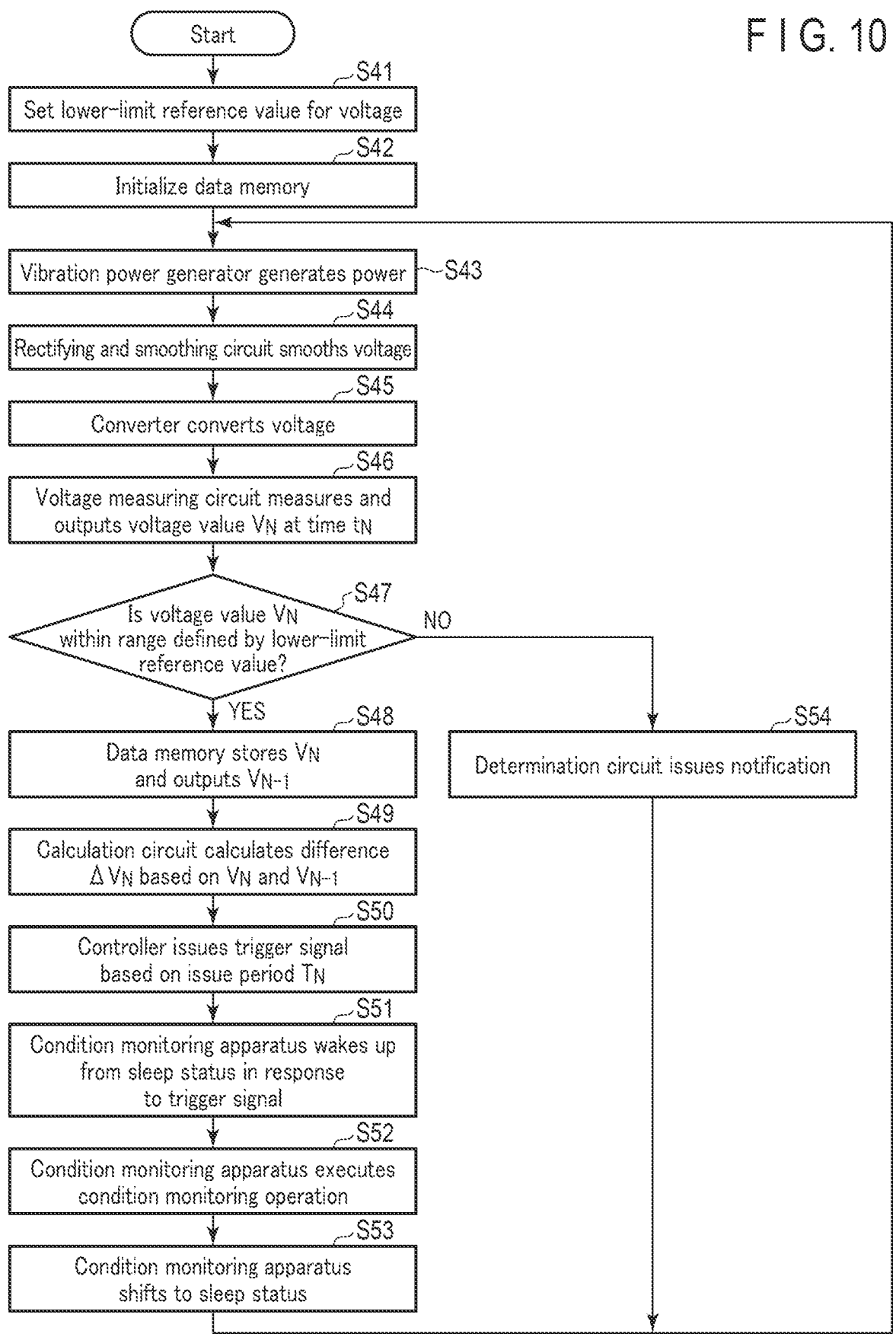
FIG. 10 is a flowchart showing an operation of a condition monitoring system according to a modification, in which a lower-limit reference value is taken into consideration.

FIG. 10 is a flowchart showing an operation of the condition monitoring system 1 according to the modification, in which a lower-limit reference value is taken into consideration. In FIG. 10, a description of a process similar to that of FIG. 5 is omitted.

At step S41, the reference value setting circuit 21 sets a lower-limit reference value. The lower-limit reference value is set to, for example, a value of a storage voltage that would be required for a stable operation in electric circuitry such as the condition monitoring apparatus 19. The lower-limit reference value may be set based on the formulation guidelines of the specifications of the storage voltage which take into account the decrease of the power generation efficiency with a low voltage, as well as the design guidelines including other margins, etc.

The processing from step S42 to step S45 is similar to that from steps S1 to S4 in FIG. 5. Accordingly, a description thereof will be omitted.

At step S46, the voltage measuring circuit 15 outputs a voltage value $V_N$ to the data memory 16, the calculation circuit 17, and the determination circuit 20.

At step S47, the determination circuit 20 determines whether or not the voltage value $V_N$ is within the range defined by the lower-limit reference value $TH_L$, namely, whether or not the voltage value $V_N$ is equal to or greater than the lower-limit reference value $TH_L$. At step S47, when the voltage value $V_N$ is determined as being within the range defined by the lower-limit reference value $TH_L$, the processing advances to step S48. At step S47, when the voltage value $V_N$ is determined as not being within the range defined by the lower-limit reference value $TH_L$, the processing advances to step S54.

The processing from step S48 to step S53 when the voltage value $V_N$ is within the range defined by the lower-limit reference value $TH_L$ is similar to that of steps S6 to S11 in FIG. 5. That is, the issue period $T_N$ is calculated based on the voltage value $V_N$, and a trigger signal is issued based on the issue period $T_N$.

At step S54, when the voltage value $V_N$ is not within the range defined by the lower-limit reference value $TH_L$, the determination circuit 20 issues a notification to the controller 18 that issue of a trigger signal is to be stopped. Thereafter, the processing returns to step S43. That is, the controller 18 does not issue a trigger signal. Accordingly, the condition monitoring apparatus 19 does not wake up.

In this manner, in the processing of FIG. 10, the controller 18 adjusts the timing of issuing a trigger signal to the condition monitoring apparatus 19 in such a manner that the storage voltage does not exceed the lower-limit reference value, based on the determination of the determination circuit 20. Thereby, the device is expected to offer a stable operation and improved efficiency.

The reference value setting circuit 21 may set both the upper-limit reference value $TH_U$ and the lower-limit reference value $TH_L$ as a modification of the first embodiment. That is, the processing of FIGS. 8 and 10 may be combined.

Two or more values may be set as each of the upper-limit reference value and the lower-limit reference value. When a plurality of upper-limit reference values are set, an operation can be performed taking hysteresis of the upper-limit reference value into consideration. When a plurality of lower-limit reference values are set, an operation can be performed taking hysteresis of the lower-limit reference values into consideration. Thereby, it can be expected that a more stable operation is ensured in the vicinity of each of the reference values.

Another Modification of First Embodiment

Figure 11:
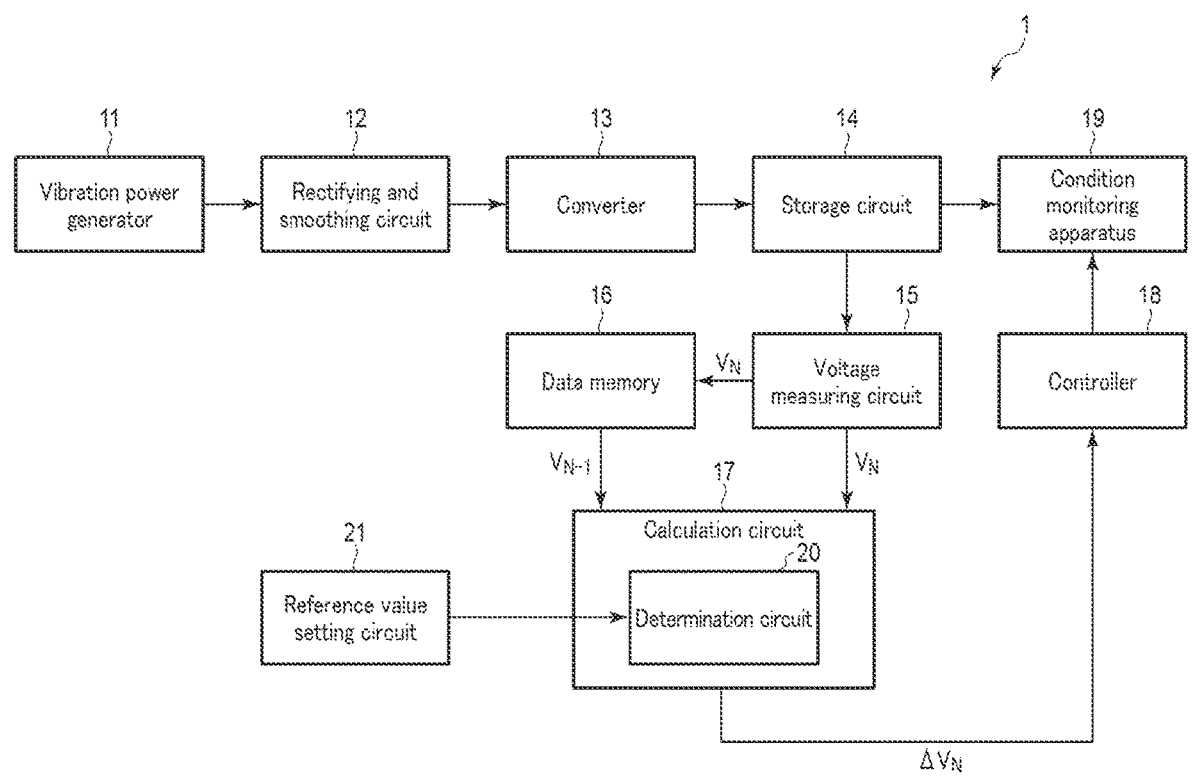
FIG. 11 is a configuration diagram of a condition monitoring system according to another modification of the first embodiment.

FIG. 11 is a configuration diagram of a condition monitoring system according to another modification of the first embodiment. In the example of FIG. 11, the calculation circuit 17 includes therein a determination circuit 20. That is, the calculation circuit 17 determines whether or not a voltage value is within a range defined by a reference value, in addition to calculating a difference $\Delta V_N$.

Second Embodiment

Figure 12:
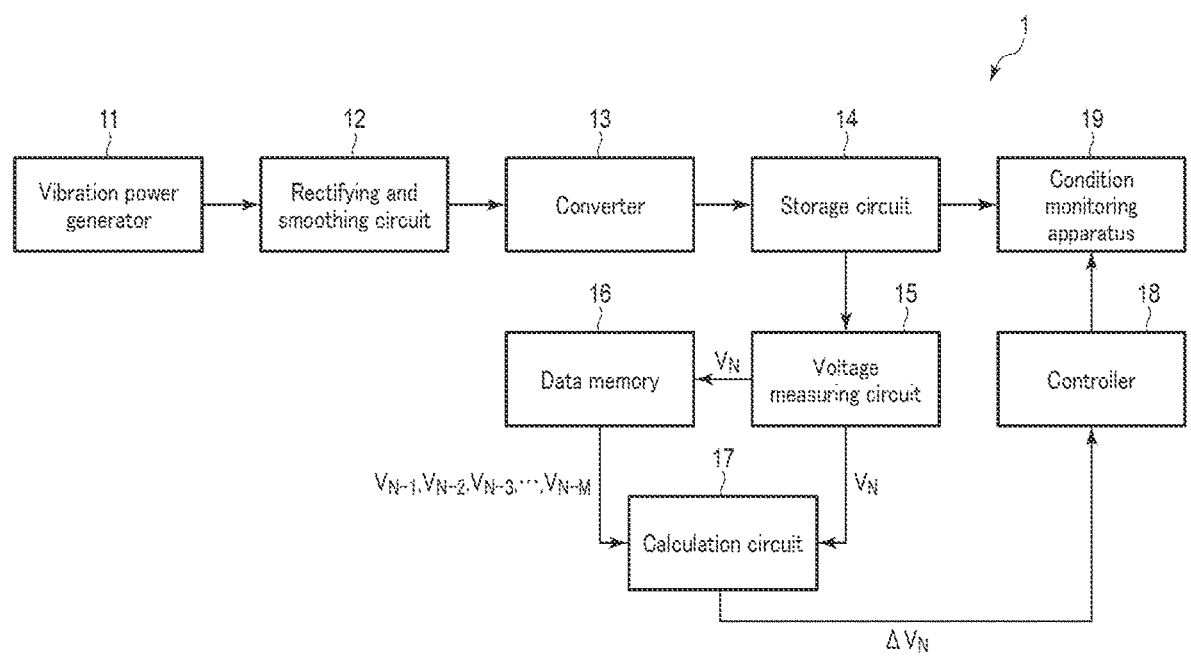
FIG. 12 is a configuration diagram of a condition monitoring system according to a second embodiment.

FIG. 12 is a configuration diagram of a condition monitoring system according to a second embodiment. In the second embodiment, the data memory 16 stores a plurality of past voltage values, instead of storing a single past voltage value. That is, the data memory 16 receives and stores a current voltage value. $V_N$ from the voltage measuring circuit 15, and outputs the N-1st, N-2nd, N-3rd, ..., and N-Mth voltage values $V_{N-1}, V_{N-2}, N_{N-3}, \ldots$, and $V_{N-M}$ to the calculation circuit 17. Here, M is a predetermined design value. The calculation circuit 17 calculates a difference $\Delta V_N$ based on the current voltage value $V_N$ and the past voltage values, and outputs the calculated result to the controller 18. For the past voltage values, simple average, weighted average, moving average, or other known smoothing technologies may be employed.

The controller 18 obtains an issue period $T_N$ of a trigger signal corresponding to the difference $\Delta V_N$ based on a predetermined relational expression or a reference table corresponding to the past voltage values. The condition monitoring apparatus 19 wakes up from the sleep status in response to a trigger signal output from the controller 18 at time $t_N$ corresponding to the issue period $T_N$, performs a condition monitoring operation for a predetermined period of time, and returns to a sleep status.

As described above, according to the second embodiment, an issue period of a trigger signal that wakes up the condition monitoring apparatus from the sleep status is determined based on a difference between the current voltage value and the past voltage values. Accordingly, it is possible to suppress a rapid change of the operation cycle by particularly suppressing the effects of environmental vibrations that vary greatly, thus achieving a more stable condition monitoring operation.

In the second embodiment, too, the timing of issue of a trigger signal may be adjusted, taking the reference value described in the first embodiment into consideration.

While certain embodiments have been described, these embodiments have been presented by way of examples only, and are not intended to limit the scope of the invention. Indeed, the embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A condition monitoring system comprising a power generator and a condition monitoring apparatus configured to execute a condition monitoring operation that monitors a condition of a target based on power generated by the power generator, the condition monitoring system comprising:
    a voltage measuring circuit configured to measure a voltage value of power generated by the power generator;
    a data memory configured to store a past voltage value measured by the voltage measuring circuit;
    a calculation circuit configured to calculate a difference between a current voltage value measured by the voltage measuring circuit and at least one past voltage value stored in the data memory; and
    a controller configured to determine an issue period indicating a period of time until a trigger signal is issued based on the difference calculated by the calculation circuit, and issues the trigger signal to the condition monitoring apparatus based on the issue period, wherein
    the condition monitoring apparatus wakes up from a sleep status upon receiving the trigger signal, and returns to the sleep status after executing the condition monitoring operation.

2. The condition monitoring system according to claim 1, wherein the power generator generates an alternating-current power, and the condition monitoring system further comprises:
    a rectifying and smoothing circuit configured to convert the alternating-current power into a direct-current power; and
    a converter configured to transform a voltage of the direct-current power.

3. The condition monitoring system according to claim 2, further comprising a storage circuit configured to store a voltage output from the converter, wherein
    the condition monitoring apparatus executes the condition monitoring operation based on the voltage stored in the storage circuit.

4. The condition monitoring system according to claim 1, wherein the calculation circuit calculates a difference between the current voltage value and the past voltage values.

5. The condition monitoring system according to claim 1, wherein the controller calculates, from at least one of previously calculated issue periods, the current issue period by subtracting a correction value based on the difference.

6. The condition monitoring system according to claim 5, wherein the controller calculates the correction value based on the previously calculated issue periods.

7. The condition monitoring system according to claim 1, further comprising:
    a reference value setting circuit configured to set a reference value for at least one of an upper limit and a lower limit of the voltage value; and
    a determination circuit configured determine whether or not the trigger signal is issued based on the reference value and the current voltage value that has been measured by the voltage measuring circuit, and notifies the controller of a result of the determination.

8. The condition monitoring system according to claim 7, wherein the calculation circuit includes the determination circuit.

9. A non-transitory storage medium storing thereon a condition monitoring program executed by a processor of a condition monitoring system comprising a power generator, a condition monitoring apparatus that executes a condition monitoring operation of monitoring a condition of a target based on a power generated by the power generator, the condition monitoring program causing the processor to execute:

measuring a voltage value of the power generated by the power generator;

storing, in a data memory, a past voltage value that has been measured;

calculating a difference between the current voltage value that has been measured and at least one past voltage value stored in the data memory;

determining an issue period indicating a period of time until a trigger signal is issued based on the calculated difference; and causing the condition monitoring apparatus having received the trigger signal to wake up from a sleep status and to return to the sleep status after executing the condition monitoring operation by issuing the trigger signal to the condition monitoring apparatus based on the issue period.

* * * * *